United States Patent [19]

Wintersteen

[11] Patent Number: 4,698,985
[45] Date of Patent: Oct. 13, 1987

[54] ACCUMULATOR-DEHYDRATOR ASSEMBLY FOR AN AIR CONDITIONING SYSTEM

[75] Inventor: Douglas C. Wintersteen, Burt, N.Y.

[73] Assignee: General Motors Corporation, Detroit, Mich.

[21] Appl. No.: 854,011

[22] Filed: Apr. 21, 1986

Related U.S. Application Data

[63] Continuation-in-part of Ser. No. 840,200, Mar. 17, 1986, Pat. No. 4,633,679.

[51] Int. Cl.[4] ............................................. F25B 43/00
[52] U.S. Cl. .............................. 62/474; 210/DIG. 66; 55/192
[58] Field of Search ..................... 62/503, 474, 475; 55/189, 190, 183; 210/DIG. 6

[56] References Cited

U.S. PATENT DOCUMENTS

| | | | |
|---|---|---|---|
| 3,942,332 | 3/1976 | Schumacher | 62/217 |
| 4,331,001 | 5/1982 | Jones | 62/503 |
| 4,354,362 | 10/1982 | Schumacher et al. | 62/474 |
| 4,509,340 | 4/1985 | Mullally et al. | 62/503 |

Primary Examiner—Henry A. Bennett
Attorney, Agent, or Firm—R. L. Phillips

[57] ABSTRACT

An accumulator-dehydrator assembly for an air conditioning system is provided with a desiccant canister outlet fitting having an integral particulate filter cage at one end an integral neck at an opposite end. The cage is insertable through and the neck is received in a flanged outlet opening in a desiccant canister that is received within the assembly's housing. The neck is also received from the interior of this housing in and sealingly engages with the housing's outlet connector. Both the neck and the flange about the canister outlet opening have radial holes which align and receive an exit end of the assembly's pickup tube arranged external of the canister. The neck and the canister outlet opening flange having cooperating angular alignment means that positively align their pickup tube accommodating holes angularly. The filter cage and the interior of the canister have cooperating longitudinal alignment means that positively align the pickup tube accommodating holes longitudinally. The outlet fitting and the canister also have cooperating detent means that retain the outlet fitting in the canister's flanged outlet opening with the pickup tube accommodating holes aligned.

3 Claims, 6 Drawing Figures

ACCUMULATOR-DEHYDRATOR ASSEMBLY FOR AN AIR CONDITIONING SYSTEM

This is a continuation-in-part application of U.S. Ser. No. 840,200, filed Mar. 17, 1986 U.S. No. 4,633,679.

TECHNICAL FIELD

This invention relates to an accumulator-dehydrator assembly for an air conditioning system and more particularly to the outlet fitting for the desiccant container contained in the assembly's housing.

BACKGROUND OF THE INVENTION

In air conditioning systems such as those used in motor vehicles, it is common practice to employ an accumulator-dehydrator assembly to ensure delivery of the refrigerant in a vapor phase to the compressor and remove any water from circulation. Moreover, where oil is also circulated for lubrication of the compressor, it is desirable that it be maintained in the vapor flow to the compressor. A design found highly efficient in meeting these various requirements is that disclosed in U.S. Pat. No. 4,331,001 assigned to the assignee of the present invention. And then there is U.S. Pat. No. 4,509,340 which proposes improvements thereof directed toward fewer parts and easier assembly. In particular, the latter design proposes forming the desiccant canister with an integral outlet fitting that projects into and sealingly engages the outlet of the accumulator housing. It has been discovered that while this approach does have certain part reduction and assembly benefits, there is then required special provision for assembling a particulate filter at the entrance to the outlet fitting internal of the canister. This is made possible in the above noted integral outlet fitting and canister design by additionally forming the desiccant canister of two halves which must be brought together and joined about the particulate filter.

SUMMARY OF THE INVENTION

The present invention minimizes the number of parts in the accumulator-dehydrator assembly and provides for their easy assembly but avoids having to make the desiccant canister with two halves or provide other special access for installing the particulate filter therein such as by an opening through the canister which then must be closed by an additional part(s). This is accomplished by forming the canister outlet fitting as a separate piece as in the afore-mentioned U.S. Pat. No. 4,331,001 but now with an integral particulate filter about the entrance end thereof as well as an integral connecting neck about the exit end thereof. A filter screen is molded and integral with the filter and the filter is insertable through and the neck is received in a flange integral with and extending about an outlet opening in the canister which is made in one piece in final form. Both the neck and the canister outlet flange have radial holes which align to receive the exit end of the pickup tube that is arranged external of the canister. The neck and the canister outlet flange have a key and slot that engage to positively align their pickup tube accommodating holes angularly and the cage and the interior of the canister have a rib and slot and stop relationship that assists the angular hole alignment and additionally provides positive longitudinal location to complete the hole alignment. Moreover, the canister outlet fitting and the canister are formed with a snap fitting relationship that retains the former in the flanged outlet opening with the pickup tube mounting holes aligned. With the outlet fitting and integral filter thus attached to the canister, the neck of the outlet fitting is then received from the interior of the housing in and sealingly engages with the housing's outlet connector to both fluidly connect and mechanically support the canister in the assembly.

DESCRIPTION OF PREFERRED EMBODIMENT

These and other objects, features and advantages of the invention will become more apparent from the following description and drawing in which.

Figures 1, 2:
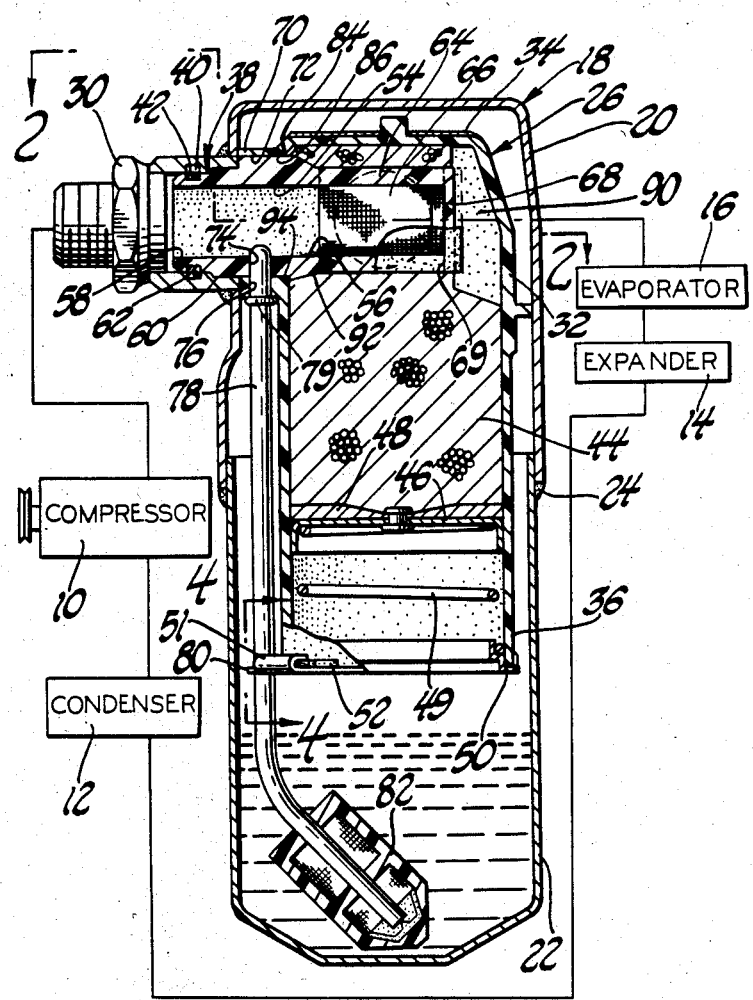
FIG. 1 is a schematic view of a motor vehicle air conditioning system having incorporated therein the presently preferred embodiment of the accumulator-dehydrator assembly according to the invention, such assembly being shown in vertical cross—section.
FIG. 2 is a view taken along the line 2—2 in FIG. 1.

Referring to FIG. 1, there is shown a motor vehicle air conditioning system generally comprising an engine driven compressor 10, condenser 12, expander 14 and evaporator 16. The system apart from the present invention is conventional and operates in the normal manner with a predetermined amount of oil entrained in the refrigerant for circulation therewith to lubricate the compressor. Because of the difficulty in providing a completely dry system prior to charging with the refrigerant, the system may also contain some water which is, of course, undesirable. Moreover, it is required that the refrigerant be delivered in vapor and not liquid form to the compressor. For these reasons, an accumulator-dehydrator assembly 18 is connected in the system between the evaporator and compressor.

The accumulator-dehydrator assembly comprises a two-piece aluminum housing formed of cup-shaped parts 20 and 22. The top part 20 is telescopically received over the bottom part 22 and these parts are sealingly joined by an annular weld 24 following installation of the desiccant canister assembly 26 in the top part as described later. Threaded inlet and outlet connectors or fittings 28 and 30 are welded to the side of the top housing part at angularly spaced locations but at the same elevation near the top thereof and connect the assembly in the system (see FIGS. 1 and 2).

Figure 3:
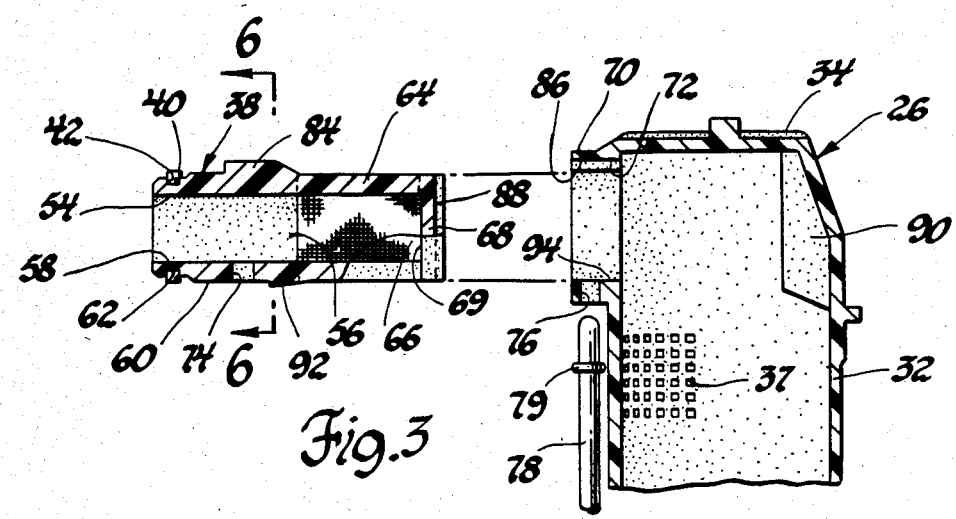
FIG. 3 is an exploded view of parts of the desiccant canister assembly in FIG. 1.
Figure 4:
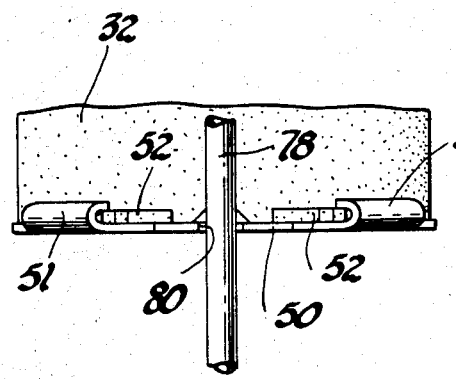
FIG. 4 is a view taken along the line 4—4 in FIG. 1.

The desiccant canister assembly 26 comprises a seamless, one-piece, molded plastic canister 32 having a generally cylindrical shape with a closed upper end 34 and an open bottom 36 and holes 37 in the side thereof but out of the path of the housing inlet fitting 28 (see FIGS. 2 and 3). The canister assembly is supported in the housing 20 adjacent the top thereof by a canister outlet fitting 38 that snap fits at one end thereof to the canister as described in detail later and snap fits at the opposite end thereof with an O-ring 40 into the housing outlet fitting 30, the latter installation being from within the housing with the ring snapping outward into a groove 42 in the housing outlet fitting. Desiccant 44 is loaded into the canister through the bottom and is thereafter retained as well as held tightly packed by a sheet metal piston 46 with a seal 48 riveted thereto. The piston 46 is biased upward to continuously pack the desiccant by a helical coil spring 49 which is seated on a sheet metal collar 50 secured by bending four (4) angularly spaced tabs 51 thereon over corresponding radially extending tabs 52 at the bottom of the canister (only one such tab connection being shown in FIG. 1).

The canister outlet fitting 38 has a cylindrical passage 54 having an entrance 56 open to the interior of the desiccant canister and an exit 58 open to the housing outlet fitting 30 (see FIGS. 1 and 3). To provide for the connection with the housing, the canister outlet fitting has an integrally formed neck 60 that extends about the exit thereof and has an external groove 62 into which the retaining ring 40 is initially assembled prior to insertion into the housing outlet fitting. The canister outlet fitting also has an integrally formed particulate filter skeleton 64 that extends about the entrance thereof and includes an integral cylindrical, particulate filter screen 66 that covers the passage entrance where it opens to the interior of the canister through two radially facing openings 69 in the filter skeleton.

The desiccant canister has a flange 70 formed integral with and projecting outward from and extending about an outlet opening 72 that receives the canister outlet fitting 38. The particulate filter skeleton 64 integral with the canister outlet fitting is sized to be insertable through and the neck 60 of this fitting is sized to be received in this flanged canister outlet opening as illustrated in FIG. 3. Both the neck 60 and the accommodating canister flange 70 have radial holes 74 and 76 which align to receive the exit end of an oil pickup tube 78 that is located the proper penetration distance by an integral collar 79 and extends vertically downward between the exterior of the canister and the interior of the housing 20, 22. The pickup tube is received in a slot 80 in the spring seat collar 50 and spot welded thereto as shown or mechanically fastened and is bent inwardly beneath the canister so as to have its entrance end close to the tapered bottom of the housing. In addition, a particulate filter assembly 82 is mounted on the lower end of the tube to screen out any foreign material.

Figure 5:
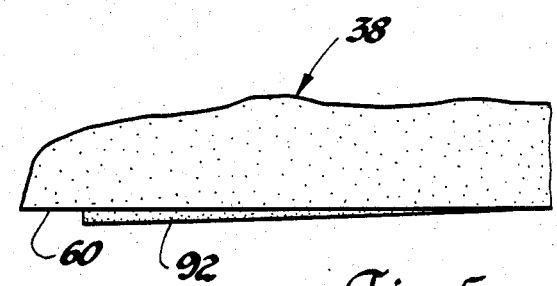
FIG. 5 is an enlarged fragmentary view of the canister outlet fitting in FIGS. 1 and 3.
Figure 6:
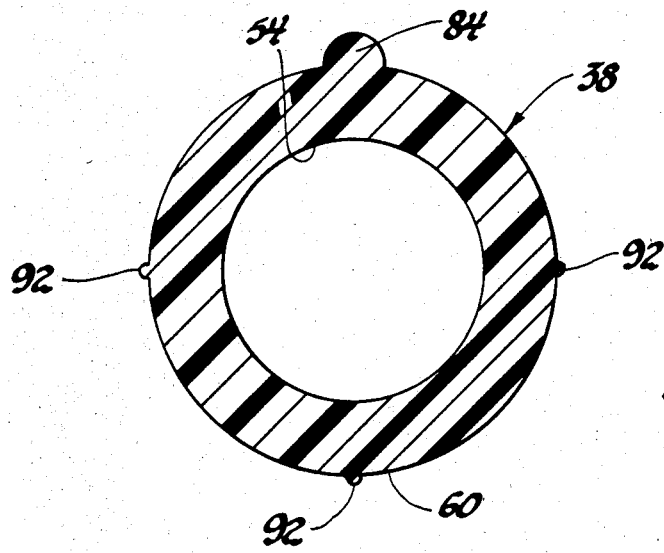
FIG. 6 is an enlarged view taken along the line 6—6 in FIG. 3.

To facilitate proper assembly of the pickup tube as well as secure the connection of the canister outlet fitting with the canister, the respective neck 60 and flange 70 of the latter two parts are formed with cooperating angular alignment means preferably in the form of a keyway arrangement comprising a radially outwardly projecting and longitudinally extending key rib 84 on the neck that engages in an internal key slot 86 of like geometrical form in the interior of the flange (see FIGS. 1, 2, 3 and 6). This provides for one-way assembly only of the fitting into the canister and positively aligns the accommodating pickup tube holes 74 and 76 in proper angular relationship. In addition, the filter skeleton 64 and the interior of the canister have cooperating longitudinal alignment means for positively aligning the accommodating pickup tube holes longitudinally. The latter means is preferably in the form of a rib and slot arrangement comprising a vertical slot 88 on the exterior side of the filter skeleton end 68 that bottoms out on a vertical rib 90 formed on the interior side of the canister to longitudinally align the holes for the pickup tube. Moreover, the canister outlet fitting and the canister have cooperating detent means for retaining this fitting in the accommodating flanged opening with the holes for the pickup tube thus aligned. The latter means is preferably in the form of a snap-fitting bead arrangement comprising three (3) beads 92 formed on the exterior of the neck 60 that are angularly spaced thereabout at 90° to each other and project radially outward and also extend longitudinally but with a taper so as to be receivable in the canister flange and then cause slight radially inward deflection of the neck (see FIGS. 3, 5 and 6). Then on continued forced insertion of the neck, the detent beads are thereby caused to snap outwardly in place past the shoulder 94 of the opening 72 to lock the canister outlet fitting and integral particulate filter in place.

Thus it will be appreciated that the canister, its outlet fitting with integral particulate filter, and the pickup tube with its separate filter may all be readily and properly assembled and the desiccant loaded whereafter the piston assembly is installed and the pickup tube then welded in place. The complete desiccant assembly 26 is then ready for mounting in the upper housing part 20 followed by installation and welding of the lower housing part 22 to the upper one.

The above described preferred embodiment is illustrative of the invention which may be modified within the scope of the appended claims.

The embodiments of the invention in which an exclusive property or privilege is claimed are defined as follows:

1. In an accumulator-dehydrator assembly for an air conditioning system comprising a housing having an inlet connector and an outlet connector by which the assembly is connected in the system, a desiccant canister located within the housing, an outlet fitting having an entrance open to the interior of the canister and an exit open to the outlet connector, a particulate filter located within the canister and connected between the exit of the outlet fitting and the interior of the canister, and a liquid refrigerant and oil pickup tube having an entrance end open to the interior of the housing adjacent the bottom thereof and an exit end open to the outlet connector through the outlet fitting, the improvement comprising a seamless one-piece molded plastic part forming the canister, a neck integral with the outlet fitting and extending about the exit of the outlet fitting, a skeleton for the filter integral with and extending about the entrance of the outlet fitting, a flange formed integral with and projecting outward from and extending about an outlet opening in the canister, the filter skeleton being insertable through and the neck being received in the flanged outlet opening, the neck also being received from the interior of the housing in and sealingly engaging with the outlet connector, both the neck and the flange having radial holes which align and receive the exit end of the pickup tube with the latter arranged external of the canister, the neck and flange having cooperating angular alignment means for positively aligning their holes angularly, and the filter cage and the interior of the canister having cooperating longitudinal alignment means for positively aligning the neck and flange holes longitudinally.

2. In an accumulator-dehydrator assembly for an air conditioning system comprising a housing having an inlet connector and an outlet connector by which the assembly is connected in the system, a desiccant canister located within the housing, an outlet fitting having an entrance open to the interior of the canister and an exit open to the outlet connector, a particulate filter located within the canister and connected between the exit of the outlet fitting and the interior of the canister, and a liquid refrigerant and oil pickup tube having an entrance end open to the interior of the housing adjacent the bottom thereof and an exit end open to the outlet connector through the outlet fitting, the improvement comprising a seamless one-piece molded plastic part forming the canister, a neck integral with the outlet fitting and extending about the exit of the outlet fitting, a skeleton for the filter integral with and extending about the entrance of the outlet fitting, a flange formed integral with and projecting outward from and extending about an outlet opening in the canister, the skeleton being insertable through and the neck being received in the flanged outlet opening, the neck also being received from the interior of the housing in and sealingly engaging with the outlet connector, both the neck and the flange having radial holes which align and receive the exit end of the pickup tube with the latter arranged external of the canister, the neck and flange having cooperating angular alignment means for positively aligning their holes angularly, the filter cage and the interior of the canister having cooperating longitudinal alignment means for positively aligning the neck and flange holes longitudinally, and the outlet fitting and the canister having cooperating detent means for retaining the outlet fitting in the flanged opening with the holes aligned.

3. In an accumulator-dehydrator assembly for an air conditioning system comprising a housing having an inlet connector and an outlet connector by which the assembly is connected in the system, a desiccant canister located within the housing, an outlet fitting having an entrance open to the interior of the canister and an exit open to the outlet connector, a particulate filter located within the canister and connected between the exit of the outlet fitting and the interior of the canister, and a liquid refrigerant and oil pickup tube having an entrance end open to the interior of the housing adjacent the bottom thereof and an exit end open to the outlet connector through the outlet fitting, the improvement comprising a seamless onepiece molded plastic part forming the canister, a neck integral with and extending about the exit of the outlet fitting, a skeleton for the filter integral with and extending about the entrance of the outlet fitting, a filter screen formed integral with the skeleton, a flange formed integral with and projecting outward from and extending about an outlet opening in the canister, the filter skeleton and screen being insertable through and the neck being received in the flanged outlet opening, the neck also being received from the interior of the housing in and sealingly engaging with the outlet connector, both the neck and the flange having radial holes which align and receive the exit end of the pickup tube with the latter arranged external of the canister, the neck and flange having cooperating keyway means for positively aligning their holes angularly, the filter cage and the interior of the canister having cooperating rib and slot means including a slot formed on an exterior side of the cage that bottoms on a rib formed on an interior side of the canister for positively aligning the neck and flange holes longitudinally, and the outlet fitting and the canister having cooperating detent means including a least one tapered bead formed on the neck for retaining the outlet fitting in the flanged opening with the holes aligned.

* * * * *